United States Patent

Birr et al.

[15] 3,639,178
[45] Feb. 1, 1972

[54] THERMOCHEMICAL CUTTING OR SCARFING PROCESS

[72] Inventors: Jacques Birr, Paris; Georges Colson, Noisy-le-grand; Bernard Abel, Eptinal; Patrice Charbonnier, Pointe Noire, (Congo), all of France

[73] Assignee: L'Air Liquide, Societe Anonyme pour l'etude et l'exploitation des procedes Georges Claude

[22] Filed: July 25, 1969

[21] Appl. No.: 844,897

[30] Foreign Application Priority Data

Aug. 2, 1968 France.....................................161765

[52] U.S. Cl..............................148/9 C, 148/9.5, 266/23 H, 266/23 P
[51] Int. Cl............................................................B23k 7/06

[58] Field of Search.....................148/9, 9 C, 9.5; 266/23 H, 266/23 P

[56] References Cited

UNITED STATES PATENTS

| 2,538,876 | 1/1951 | Meincke | 148/9 C |
| 2,654,329 | 10/1953 | Fleming | 148/9 C |

*Primary Examiner*—Curtis R. Davis
*Attorney*—Young & Thompson

[57] ABSTRACT

Scarfing or cutting with a scarfing or cutting torch comprising a central duct of oxygen, a coaxial plurality for flame-producing ducts and, around this plurality of ducts, powder jets producing ducts. The powder jets approximately converge on the central duct axis, between the torch and the part being scarfed, at the hottest part of the flames.

2 Claims, 3 Drawing Figures

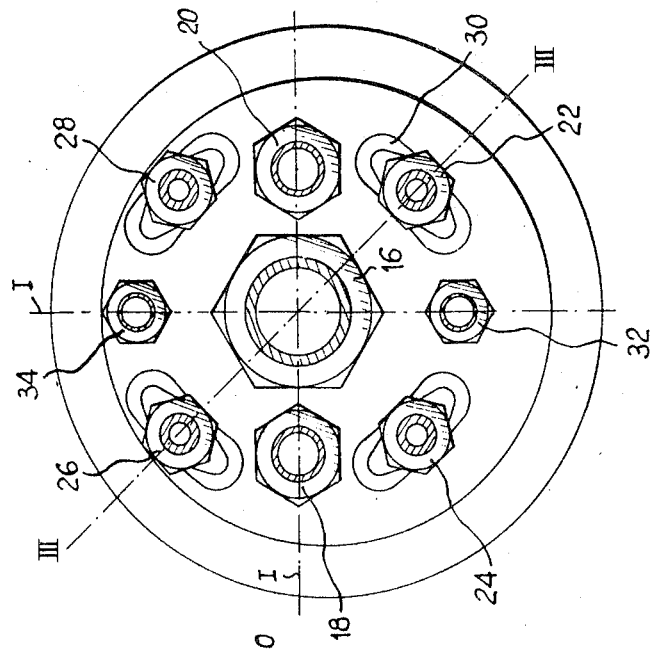
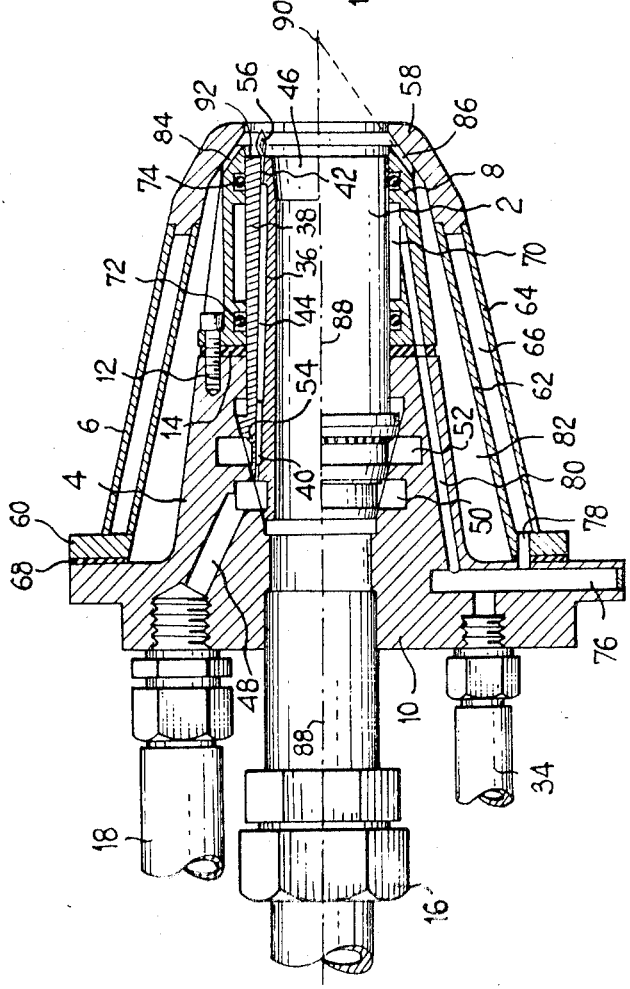

THERMOCHEMICAL CUTTING OR SCARFING PROCESS

This invention relates to a process of cutting or scarfing with the use of cutting or scarfing torch.

According to the present invention, there is provided a process of cutting or scarfing with a cutting or scarfing torch which comprises first central duct means through which there can be conveyed a jet of machining oxygen, second duct means which is distributed around said first, central duct means and through which there can be conveyed a jet of combustible gas for producing a heating flame, and third duct means which is distributed around said second duct means and through which there can be conveyed a jet of combustible powder, wherein said third duct means are disposed so that, in use, the combustible powder issues therefrom in a direction which is inclined relative to the axis of the first, central duct so as to converge approximately in the vicinity of a point on the axis of the first, central duct not far from the outlet thereof.

The scarfing torch of the invention makes it possible to direct a large quantity of combustible powder completely towards the hottest portion of the heating flames, so that it is heated entirely to a temperature at least equal to that at which it ignites in the oxygen. The combustible powder thus has the optimum effect. This advantage is all the more marked when the direction of the flow of the powder issuing from the third duct means is such that it does not intersect the axis of the first, central duct but passes the said axis at a short distance therefrom.

Since certain parts of the torch receive a considerable supply of heat, it is advantageous to provide a well-designed circulation of cooling water.

As the combustible gas for the heating flame there can be used any desired gas whereof the combustion by oxygen produces a high temperature; suitable combustible gases include acetylene, propane, a gas mixture having a base of methylacetylene, natural gas, or coke oven gas.

For a better understanding of the invention, and to show how the same may be carried into effect, reference will now be made, by way of example, to the accompanying drawings in which:

FIG. 1 shows a side view of a scarfing torch in which the upper half of the figure is a half section taken on the horizontal line I of FIG. 2 and in which the lower half of the figure is a half section taken on the vertical line I of FIG. 2;

FIG. 2 shows an end view of the scarfing torch of FIG. 1 as seen from the left of FIG. 1.

Figure 3:
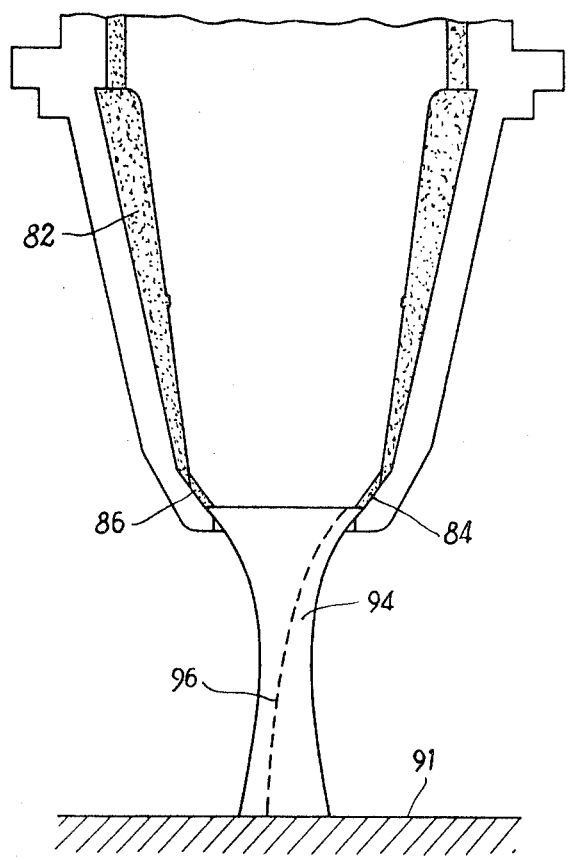
FIG. 3 shows diagrammatically, and as a section on the plane III III—III of FIG. 2, the flow path of powder through the scarfing torch.

The scarfing torch shown in the drawings essentially comprises a scarfing head 2, a front part 4 and an external shell 6.

For ease of manufacture, the front part 4 is made in two portions 8 and 10, clamped together by screws, such as screw 12, and with a sealing element 14 disposed therebetween. The portion 10 is provided at its rear face with a number of connections 16, 18, 20, 22, 24, 26, 28, 32 and 34, as shown in FIG. 2, which are arranged in as symmetrical a manner as possible in order to minimize the deformation of the front part, and the stresses which develop therein, under the action of heat.

The scarfing oxygen is fed to the torch by way of connection 16.

The heating oxygen and acetylene are fed to the torch by way of connections 18 and 20, respectively.

The combustible powder is fed to the torch by way of the four connections 22, 24, 26 and 28, which are flared, as indicated at 30 for example, in order to distribute the powder in a better manner about the axis of the torch.

The cooling water is fed to the torch through connection 32 and returns through connection 34.

The scarfing head 2 is formed of two coaxial sleeves 36 and 38 which are a force-fit. The sleeve 36 comprises elongated recesses, which form between the sleeves ducts, such as ducts 40 and 42, and a chamber 44. The scarfing head 2 is urged towards the left, as seen in FIG. 1, by a nut which is not shown but which is screwed into the front part; this movement is stopped by the frustoconical surfaces of the scarfing head, which abut on the corresponding surfaces of the front part 4. The conicity of these frustoconical surfaces and their polish provides sufficient gastightness.

The scarfing oxygen passes directly through the scarfing head from connection 16, by way of a large axial duct 46.

The heating oxygen passes from connection 18 through a duct 48 into an annular chamber 50 from which it is directed, through ducts, such as ducts 40 and 42, and through a chamber 44 towards the outlet of the torch.

The heating acetylene travels from the connection 20 by way of a duct (not shown) to another annular chamber 52 from which it passes, by way of orifices, such as orifice 54, into the ducts 40 where it mixes with the heating oxygen and issues with it from the torch, producing short and very hot flames one of which is represented as a jet 56.

The external shell 6 essentially comprises a torch nose 58, a flange 60 and, joining these two parts, two coaxial, frustoconical tubes 62 and 64 made of copper sheet, which has been rolled or stamped, for example, and which constitutes the walls of a first cooling water jacket 66. The flange 60 is secured by screws (not shown) to the portion 10 of the front part 4, with a sealing element 68 disposed therebetween. A second cooling jacket 70 comprises a space defined between the external surface of the scarfing head 2 and a section of the portion 8 of the front part 4. Two sealing elements 72 and 74, which can, for example, be in the form of toroidal elements or O-ring seals, provide sealing tightness for this jacket.

The water which has been heated in the two cooling jackets passes into a collector 76 by way of ducts 78 and 80 and from the collector 76 passes into the connection 34. The cooling water is conveyed from the connection 32 to the cooling jackets 66 and 70 by a collector and symmetrical ducts in a manner which is similar to that described in the case of the heated water.

The several powder supply connections 22, 24, 26 and 28 are connected to a chamber 82, which is formed between the front part 4 and the external shell 6 of the torch, by a number of ducts (not shown). These ducts have a very elongated cross section so as the ensure that the powder arrives fairly uniformly distributed over the entire base of the chamber 82. The powder, which is generally iron powder issues from the chamber through an assembly of ducts, such as ducts 84 and 86, bounded by the nose of the torch and recesses formed in the portion 8. The axis of these latter ducts, such as ducts 84 and 86, are oblique relative to the axis 88 of the torch and do not intersect it. The contact between the jets of powder and the flames is in this case better than when the jets of powder converge, or almost converge, upon the axis of the torch. The jets of powder approach one another approximately along an imaginary surface constricted in the vicinity of a point 90 on the axis situated between the nose 58 of the torch and the surface to be scarfed. The jets of powder thus pass into a very hot and not too narrow portion of the heating flames, each jet passing into several flames when the direction of the jets issuing from, for example, the ducts 84 and 86 does not intersect the axis 88.

The nose of the torch projects beyond the surface 92 at which the ring of flames 56 issues from the torch and it thus contributes to the guiding of the jets of powder. The nose of the torch receives an intense heat flow coming from the combustion products and the molten oxidized bath due to the cutting or scarfing work; but the jacket 66 enables it to retain a sufficiently low temperature.

The path of the powder is shown diagrammatically in FIG. 3 in which the torch is shown in a position corresponding to the start of a scarfing pass, and is therefore perpendicular to the surface of a workpiece 91 to be scarfed, which is assumed to be horizontal. After being fed into the chamber 82, the powder follows the ducts such as ducts 84 and 86, and escapes from the torch in jets directed approximately along a hyperboloid 94 the constriction of which corresponds to the point 90 in FIG. 1. In fact, in the torch illustrated, the axes of the ducts 84 and 86 do not intersect the axis 88. The paths followed by the powder in the air are in reality slightly curved by gravitational force, as represented by the imaginary line of flow shown at 96.

The cooling jacket 70 prevents deformations of the conical bearing surfaces of the scarfing head which would otherwise occur if the scarfing head were not cooled except by its contact with the front part 4.

In one specific embodiment of a scarfing torch according to the invention the torch had the following approximate dimensions and operating conditions, the torch being in a vertical position as shown in FIG. 3:

a. Diameter of the oxygen duct 46: 35 mm.;

b. Diameter of the constricted portion of the powder hyperboloid 94 (in the absence of flames, which deflect the powder jets): 20 mm.;

c. Distance between torch nose and the workpiece 91: 80 mm.; and d. Distance between torch nose and the constricted portion of the powder hyperboloid 94: 30 to 40 mm.

The scarfing torch particularly described above can be modified in several ways.

The assembly of ducts from which the jets of powder issue may be replaced by an annular slot the general shape of which is conical. In this way, the distribution of the powder about the axis of the torch is improved but it is difficult to keep the thickness of the layer of powder constant in one and the same cross section.

What we claim is:

1. In a cutting or scarfing process by means of a torch having first central duct means for supplying a jet of machining oxygen, second duct means about said first duct means for the supply of a mixture of combustion supporting and of combustible gas for producing heating flames, and third duct means about said second duct means for the supply of combustible powder, said powder issuing from the torch in convergent streams of powder, the improvement comprising effecting the convergency of the powder streams between the surface at which the heating flames issue from the torch and the surface of the workpiece being cut or scarfed with said convergency adjacent the hottest part of the heating flames.

2. The improvement as claimed in claim 1, in which the streams of powder are emitted along lines that do not intersect the axis of said first duct means, said lines lying on the surface of a hyperboloid the narrowest part of which is located between the surface at which the heating flames issue from the torch and the surface of the workpiece being cut or scarfed.

* * * * *